April 22, 1952     H. A. WAGNER ET AL     2,594,236
MOBILE CEMENT MIXER DRUM DRIVE
Filed July 25, 1949     2 SHEETS—SHEET 1
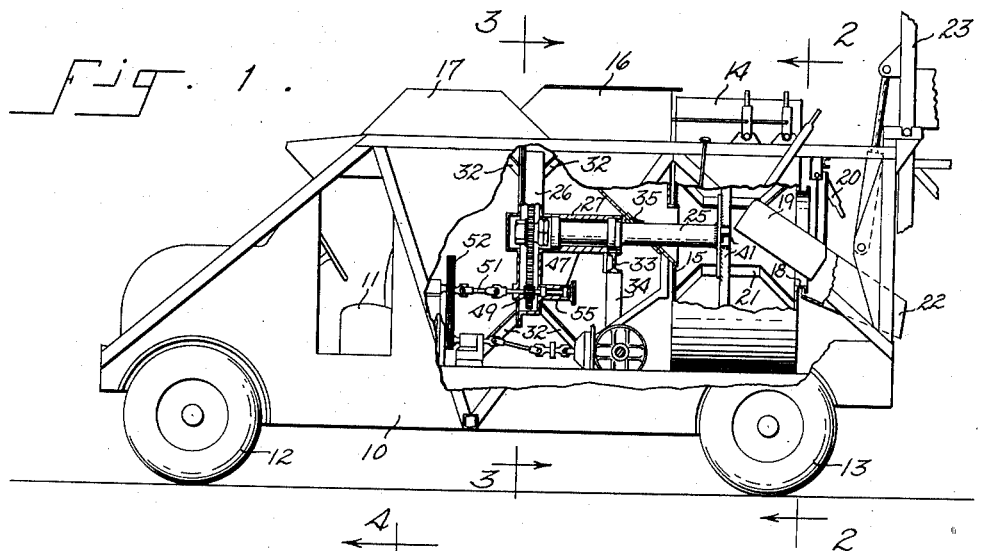
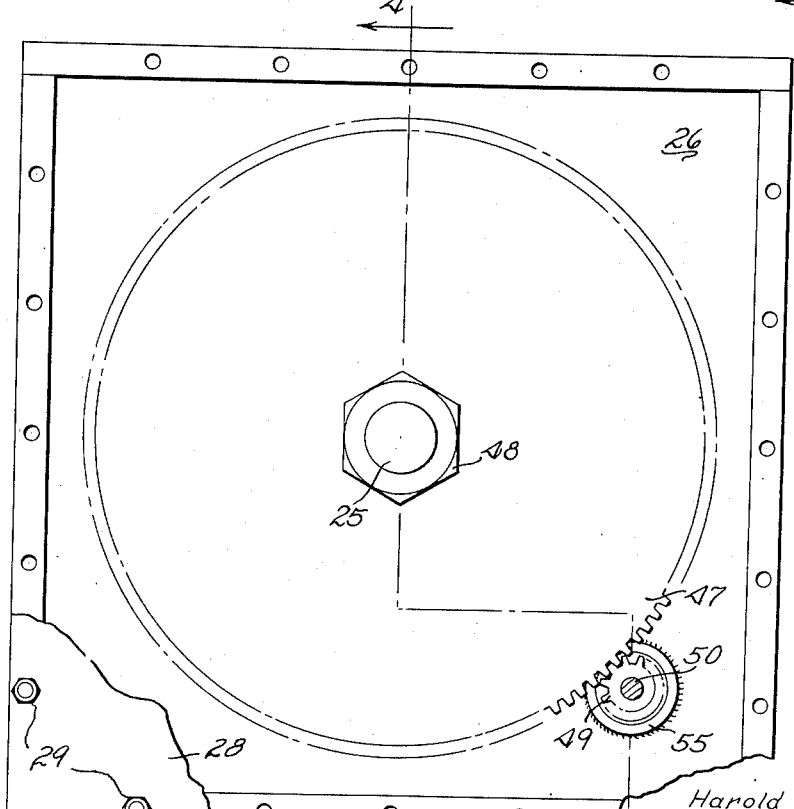
INVENTORS
Harold A. Wagner
Gustave H. Wagner
BY Buckhorn and Cheatham
Attorneys

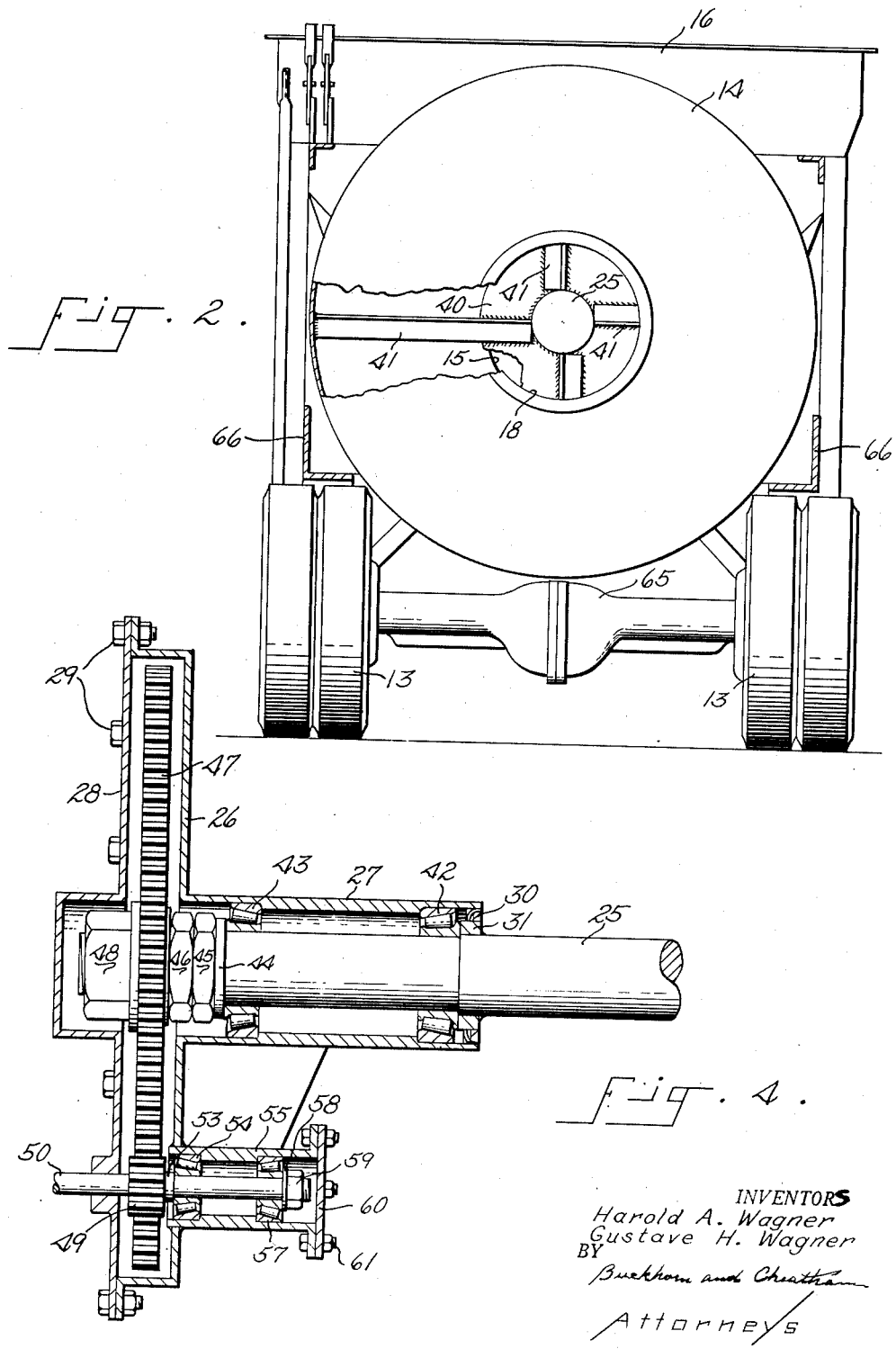

UNITED STATES PATENT OFFICE 2,594,236

MOBILE CEMENT MIXER DRUM DRIVE

Harold A. Wagner and Gustave H. Wagner,
Portland, Oreg.

Application July 25, 1949, Serial No. 106,524

3 Claims. (Cl. 259—177)

Our present invention comprises an improvement in mixers adapted to mix dry ingredients with water to form concrete, mortar, plaster or the like. The present application is concerned with an improvement in driving means for a drum of the character described which may be employed in stationary or mobile mixers, the invention being of greatest utility in mobile, self-propelled mixers such as disclosed and claimed in our prior patents, No. 2,258,918, October 14, 1941; No. 2,322,900, June 29, 1943; No. 2,327,473, August 24, 1943; Nos. 2,327,476 and 2,327,477, August 24, 1943; and our copending application, Serial No. 106,523, filed concurrently herewith.

The principal object of the present invention is to provide an improved driving means for a drum of the aforesaid type which is simplified in construction, is not subject to excessive wearing as in the previous devices of the same character, and which is particularly adapted for rough usage in construction operations.

A further object of the present invention is to provide such a drum which may be mounted upon a mobile or automotive vehicle without the necessity for providing a rigid, sturdy frame having means engaging the exterior, cylindrical surface of the drum for supporting and rotating the drum. All such devices of the prior art include a large ring gear located upon the exterior of the drum which engages a driving pinion in order that the drum may be rotated. The large ring gear is not only expensive to fabricate and mount, but the drum must be mounted in a sturdy frame in order that the teeth of the ring gear may remain in mesh with the driving pinion. In an automotive or mobile vehicle the bouncing and rough handling of the vehicle often results in misalignment of these parts, with the result that excessive wear soon results in failure of the device. Furthermore, these parts are exposed, and the grease thereon soon collects grit, cement and other abrasive particles which soon cause excessive wear to destroy either the pinion or the ring gear. The present invention eliminates all of these objectionable features.

A further object of the present invention is to provide a device of the character described which may be mounted at a low position on a standard truck or other vehicle, thereby increasing the maneuverability and the rate of speed of the vehicle. This object is achieved by the elimination of the supporting rollers and external ring gear which require raising of the center of the drum to a relatively high point.

A further object of the present invention is to provide driving means for a mixing drum of the character described, which driving means comprises gears and associated parts which are protected within a sealed casing. By reason of this construction increased life of the apparatus is assured, since all meshing and wearing surfaces may be enclosed and sealed within a mass of lubricant, the construction being such that an annual inspection and replenshiment of lubricant will suffice. It is notorious that cement mixers and mixers of similar character do not receive the maintenance required in order to prevent excessive wear, and the present invention is designed to eliminate the necessity for a rigid maintenance program.

The present invention, while primarily designed for the mixing of dry and moist ingredients at the location of usage, is also of utility in automotive vehicles for the transportation of pre-mixed cement or similar substances.

The foregoing and other objects and advantages of the present invention will be more readily ascertained from inspection of the following specification taken in connection with the accompanying drawings wherein like numerals refer to like parts throughout, while the features of novelty will be more distinctly pointed out in the appended claims.

In the drawings, Fig. 1 is a side elevation of an automotive cement mixing machine with portions broken away to illustrate the present invention;

Fig. 2 is a vertical section taken substantially along line 2—2 of Fig. 1, with a porton of the drum broken away to illustrate interior details;

Fig. 3 is a vertical section taken substantially along line 3—3 of Fig. 1; and

Fig. 4 is a vertical section taken substantially along line 4—4 of Fig. 3.

The present invention is illustrated in connection with an automotive vehicle comprising a chassis 10 having a driver's seat 11 therein and which is mounted upon forward steering wheels 12 and rear driving wheels 13. As fully illustrated in the aforesaid copending application, dry ingredients may be loaded into a mixing drum 14 through a coaxial inlet opening 15 from a hopper 16, and water may be discharged into the drum through said inlet opening 15 from a metering device including a water storage tank 17. The mixture may be discharged from the drum through a coaxial outlet opening 18 through which a movable spoon 19 may be moved by a handle 20 or equivalent means. Materials which are being churned about by baffles 21 in the interior of the drum fall onto the spoon when in position in the drum and are discharged through a chute 22 into suitable conveying means such as a bucket (not shown) which may be elevated along a tower 23 such as fully illustrated and described in the aforesaid copending application. It is to be appreciated that the present invention is concerned with the drum 14 and the driving means therefor, hence illustration of the dry ingredient loading means, water metering means and other details is unnecessary. Also, it is to be appreciated that the drum and driving means therefor may be mounted upon a stationary frame or upon other forms of mobile devices.

In accordance with the present invention, the drum 14 is supported upon the interior end of a horizontally extending shaft 25 which extends through the inlet opening 15, is rotatably supported by means engaging an intermediate portion of the shaft located exteriorly of the drum, and is rotated by driving means operatively engaging the exterior end thereof. In the present invention the supporting means comprises a casing 26 including a flanged rear wall having a horizontal sleeve 27 extending therefrom and through which the shaft projects into the casing. The casing and sleeve are sealed by a removable front cover 28 held in position by bolts 29, and by an oil seal 30 mounted in the end of the sleeve and including a sealing member engaging a flange 31 welded onto the shaft 25. The casing 26 is supported by suitable means such as structural members 32 welded thereto and to suitable portions of the chassis, and the end of the sleeve 27 is supported by a structural member 33 extending laterally across the chassis and braced by other structural members 34. The shaft 25 extends through the bottom wall of the hopper 16 which conducts the dry ingredients into the drum, and a sealing flap 35 may be provided in order to prevent ingredients from falling through the opening in the hopper wall provided to accommodate the shaft.

Means are provided within the drum for mounting the drum coaxially about the interior end of the shaft 25. Such means preferably comprises a disc flange 40 welded to the end of the shaft 25 and a plurality of radially extending arms 41 welded to the disc flange 40 and to the interior surface of the drum, the construction thus comprising a supporting spider. The drum is therefore entirely supported by the shaft 25 which in turn is supported by the bearing members enclosed within the sleeve 27.

The shaft 25 is rotatably supported in oppositely directed, tapered roller-bearing assemblies 42 and 43 mounted in spaced portions of the sleeve 27. The flange 31 welded onto the shaft thrusts against the inner raceway of bearing 42 and the outer raceway thereof is seated against a shoulder in the sleeve. The outer raceway of bearing assembly 43 is seated against a shoulder in the sleeve 27 and the inner raceway thereof bears against a washer 44 surrounding the shaft and held in position by a large nut 45 and lock nut 46. A large gear 47 is fixed to a reduced portion of the shaft 25 beyond lock nut 46 and retained thereon by a large nut 48 threaded onto the threaded end of the reduced portion of the shaft. The gear 47 meshes with a driving pinion 49 fixed to a drive shaft 50 which is suitably driven through a flexible shaft 51 and sprocket chain 52 having driving engagement with the motor, engine, or other means for rotating the drum (not shown). Shaft 50 is provided with an enlargement 53 which bears against the inner raceway of a tapered roller-bearing assembly 54, the outer raceway of which is seated against a shoulder in a sleeve 55 welded to the rear wall of the casing 26. The free end of shaft 50 is supported in a tapered roller-bearing assembly 56, the outer raceway of which is seated against a shoulder in the sleeve and the inner raceway of which is engaged by a washer 58 retained on the shaft by a nut 59. The outer end of the sleeve is sealed by a cover plate 60 retained against a flange on the sleeve by bolts 61.

The driving gears for the drum are thus sealed within lubricant-retaining means. The sleeves 27 and 55 may be packed with a suitable lubricant, and the interior of the casing 26 may be packed with the same or a different form of lubricant. The removal of the covers 60 and 28 at periodic intervals, such as during an annual overhauling period for all equipment owned by a contractor or builder, will permit replenishment of the lubricant for the bearings and gears. There are no exposed parts subject to wear which could become excessively worn by accumulations of grit and other abrasive substances.

The foregoing construction permits the more efficient utilization of automotive vehicles for the purpose of supporting and transporting drums of the aforesaid character. As will be seen in Fig. 2, the surface of the drum may extend closely adjacent the inner surfaces of rear wheels 13 and closely above the differential housing 65. Such a construction is permitted by reason of the absence of bearing rings and ring gears on the outside of the drum. By reason of this construction a drum may extend below the normal bed level of a truck or the like, such a bed usually being mounted upon longitudinal frame members represented by the angle bars 66. Not only is a lower center of gravity thereby realized, permitting higher speeds in moving about, but less over-all height of the vehicle is required so that it may be driven through the normal door openings of buildings under construction. A further advantage thereby achieved is that the hopper 16 has its upper edge at a lower height, thereby decreasing the elevation to which dry ingredients must be elevated in a mobile mixer of the type illustrated in Fig. 1. It is to be appreciated that the present construction is practically noiseless, thereby eliminating the chattering and churning noises usually associated with mobile mixers of the type under consideration.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. A mixing machine comprising a wheeled vehicle, a mixing drum mounted for rotation about a horizontal axis extending longitudinally and centrally of the vehicle, said drum having a coaxial inlet opening for charging materials thereinto and an opposed coaxial outlet opening of lesser diameter than the drum through which mixed materials may be discharged, a shaft extending along the axis of revolution of the drum and ending within the drum, said shaft extending through said inlet opening and including a portion spaced exteriorly of said drum, means within said drum connecting said drum to an interiorly located portion of said shaft, means outside of said drum rotatably supporting said exteriorly located portion of said shaft and providing the sole support for said drum, shaft rotating means operatively connected to said exteriorly located portion of said shaft, and spoon means movable into and out of said outlet opening for removing mixed materials from said drum.

2. A mixing machine comprising a wheeled vehicle, a mixing drum mounted for rotation about a horizontal axis extending longitudinally and centrally of the vehicle, said drum having a coaxial inlet opening at its forward end for charging materials thereinto and an opposed coaxial outlet opening of lesser diameter than the drum through which mixed materials may be discharged, a shaft extending along the axis of revolution of the drum through said inlet opening, said shaft having one end lying within the drum and its other end spaced from said inlet opening, means located within said drum and spaced from the ends thereof connecting said drum to an interiorly located portion of said shaft, means outside of said drum rotatably supporting the projecting portion of said shaft, shaft rotating means operatively connected to the projecting portion of said shaft, and a mixture removing spoon pivotally mounted on the rear of the vehicle and movable through said outlet opening into the interior of the drum in the clear space between the end of said shaft and said outlet opening.

3. A mobile mixing machine comprising a wheeled vehicle, a mixing drum mounted upon said vehicle for rotation about a horizontal axis extending longitudinally and centrally of the vehicle, said drum having an inlet opening in its forward end and an outlet opening in its rearward end, a shaft rotatably mounted along the axis of rotation of said drum and extending through said inlet opening from an intermediate point within said drum, arms spaced from the ends of said drum connecting the interiorly located end of said shaft to said drum for supporting said drum upon said shaft, gear means operatively connected to the exteriorly located end of said shaft for rotating said drum, sole supporting means for said drum comprising a casing enclosing said gear means, a sleeve extending from said casing and surrounding an intermediate portion of said shaft, bearing means mounted in said sleeve and rotatably supporting said shaft, a spoon pivotally mounted on said vehicle adjacent said outlet opening, and means for swinging said spoon into said drum through said outlet opening.

HAROLD A. WAGNER.
GUSTAVE H. WAGNER.

REFERENCES CITED

The following references are of record in the file of this patent:

UNITED STATES PATENTS

| Number | Name | Date |
|---|---|---|
| 892,239 | Fish | June 20, 1908 |
| 973,543 | Muller | Oct. 25, 1910 |
| 1,067,042 | Levalley | July 8, 1913 |
| 1,083,329 | Lancia | Jan. 6, 1914 |
| 1,234,230 | Sturtevant | July 24, 1917 |
| 2,066,067 | Clark | Dec. 29, 1936 |
| 2,207,011 | Hopkins | July 9, 1940 |
| 2,458,087 | Maier | Jan. 4, 1949 |